Oct. 18, 1932.  E. A. FORD  1,882,797
PERFORATED CARD INTERPRETER
Filed Feb. 6, 1930  8 Sheets-Sheet 1

Oct. 18, 1932. E. A. FORD 1,882,797
PERFORATED CARD INTERPRETER
Filed Feb. 6, 1930 8 Sheets-Sheet 2

FIG. 2.

Oct. 18, 1932.  E. A. FORD  1,882,797
PERFORATED CARD INTERPRETER
Filed Feb. 6, 1930    8 Sheets-Sheet 4

Inventor
E. A. Ford
By his Attorney
W M Wilson

Oct. 18, 1932.  E. A. FORD  1,882,797
PERFORATED CARD INTERPRETER
Filed Feb. 6, 1930   8 Sheets-Sheet 5

Inventor
E. A. Ford
By his Attorney

Oct. 18, 1932.  E. A. FORD  1,882,797
PERFORATED CARD INTERPRETER
Filed Feb. 6, 1930  8 Sheets-Sheet 6

Inventor
E. A. Ford
By his Attorney
WM Wilson

Oct. 18, 1932.  E. A. FORD  1,882,797
PERFORATED CARD INTERPRETER
Filed Feb. 6, 1930  8 Sheets-Sheet 7

Oct. 18, 1932.     E. A. FORD     1,882,797
PERFORATED CARD INTERPRETER
Filed Feb. 6, 1930     8 Sheets-Sheet 8

Inventor
E. A. Ford
By his Attorney
W. M. Wilson

Patented Oct. 18, 1932

1,882,797

UNITED STATES PATENT OFFICE

EUGENE A. FORD, OF SCARSDALE, NEW YORK, ASSIGNOR TO THE TABULATING MACHINE COMPANY, OF ENDICOTT, NEW YORK, A CORPORATION OF NEW JERSEY

PERFORATED CARD INTERPRETER

Application filed February 6, 1930. Serial No. 426,341.

In the tabulating machine art it is the common practice to perforate record cards with statistical data in the form of perforations wherein the position of each perforation in an index column determines the data recorded. The record cards are sorted by machines which under control of the perforations separate the cards into different groups corresponding to the index perforations and after such sorting the cards are usually passed through tabulating machines where, under control of the index perforations, the data is accumulated or listed. The cards are generally perforated in punching machines. Reading of the cards while easy for an experienced person is sometimes difficult for one who is not familiar with the system of perforating employed. To facilitate the reading of the cards it has accordingly been proposed to print above each column the data indicated by the perforations. This printing is preferably accomplished in the margin of the card adjacent to the corresponding perforation.

The object of the present invention is to provide a machine for this purpose capable of rapidly and accurately printing the perforated data above each column in a single line.

Another object is to provide a machine for pneumatically analyzing the card or record while in motion and printing data corresponding to the perforations above each column in one line.

A further object is to provide pneumatic means for analyzing a perforated card and positioning the printing mechanism. Also to provide pneumatic means for locating the card in printing position.

Another object is to provide novel mechanism for stopping the machine when the supply of cards is exhausted. Improved ribbon reversing mechanism is also included.

Another object is to provide frictionally driven, oscillating printing wheels and a common printing hammer to cause simultaneous printing from all wheels in printing position.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

Figure 1:
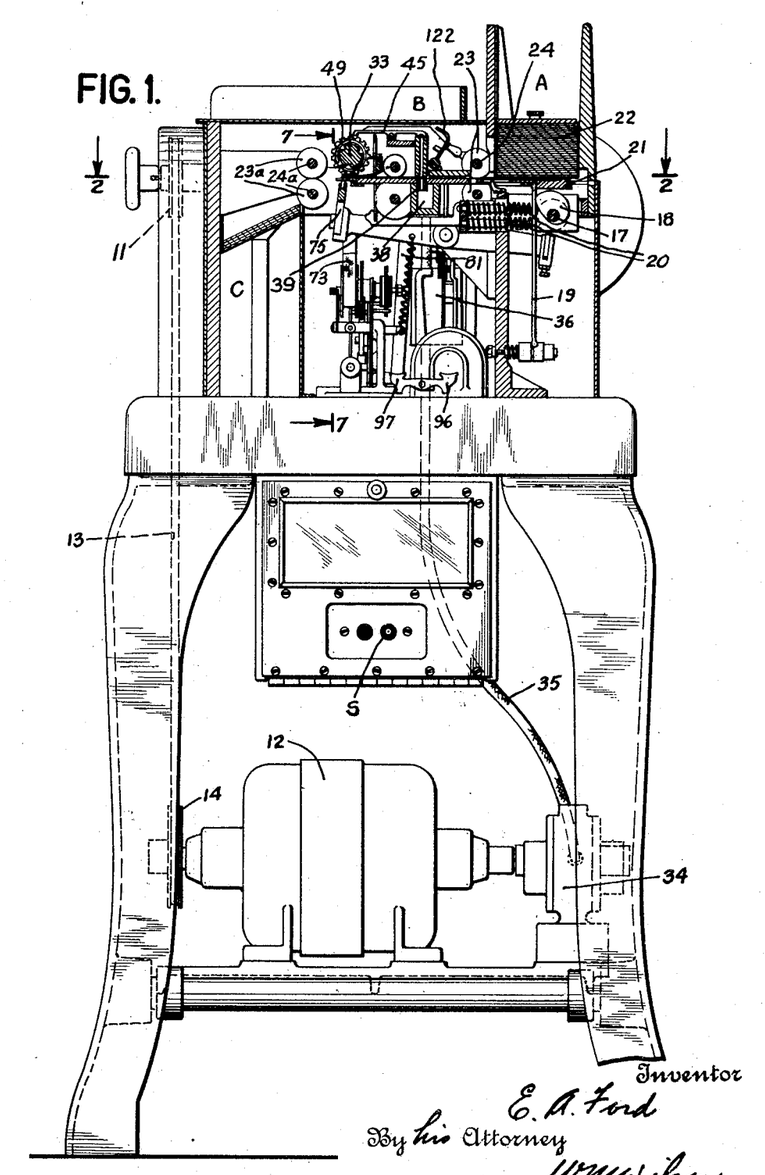
Fig. 1 is a general assembly of the machine in section.
Figure 2:
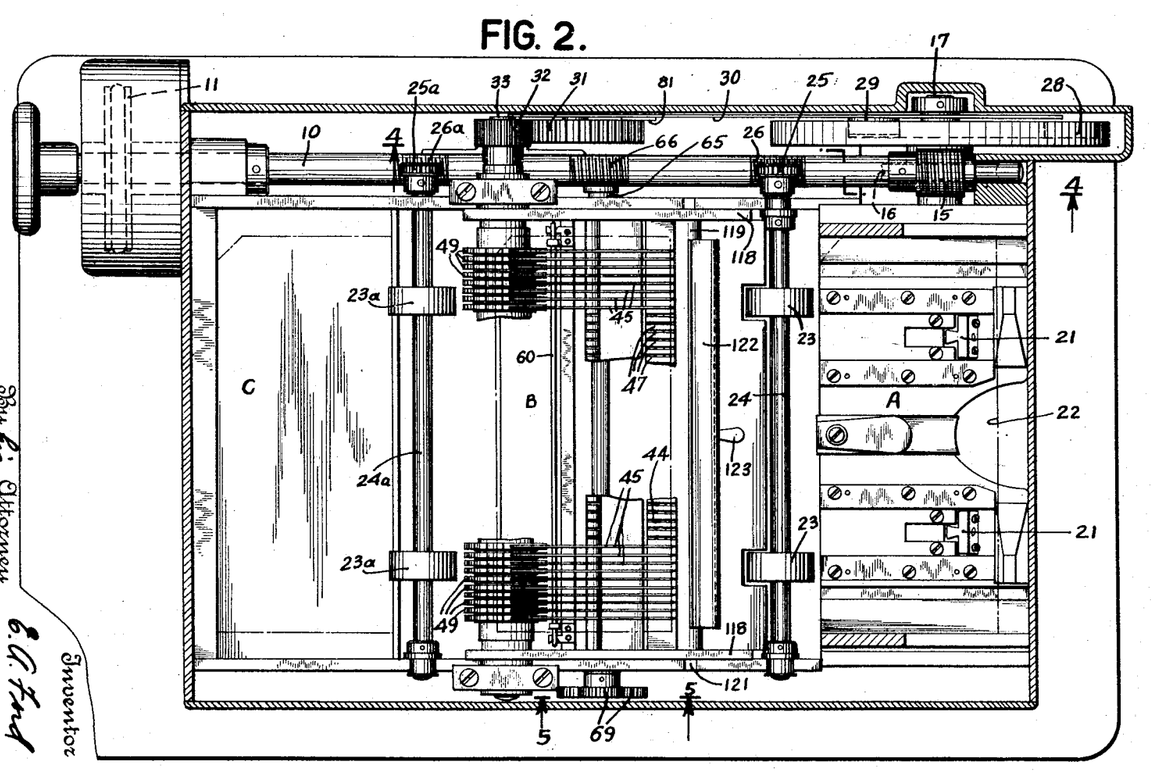
Fig. 2 is a plan sectional view on line 2—2 of Fig. 1.
Figure 3:
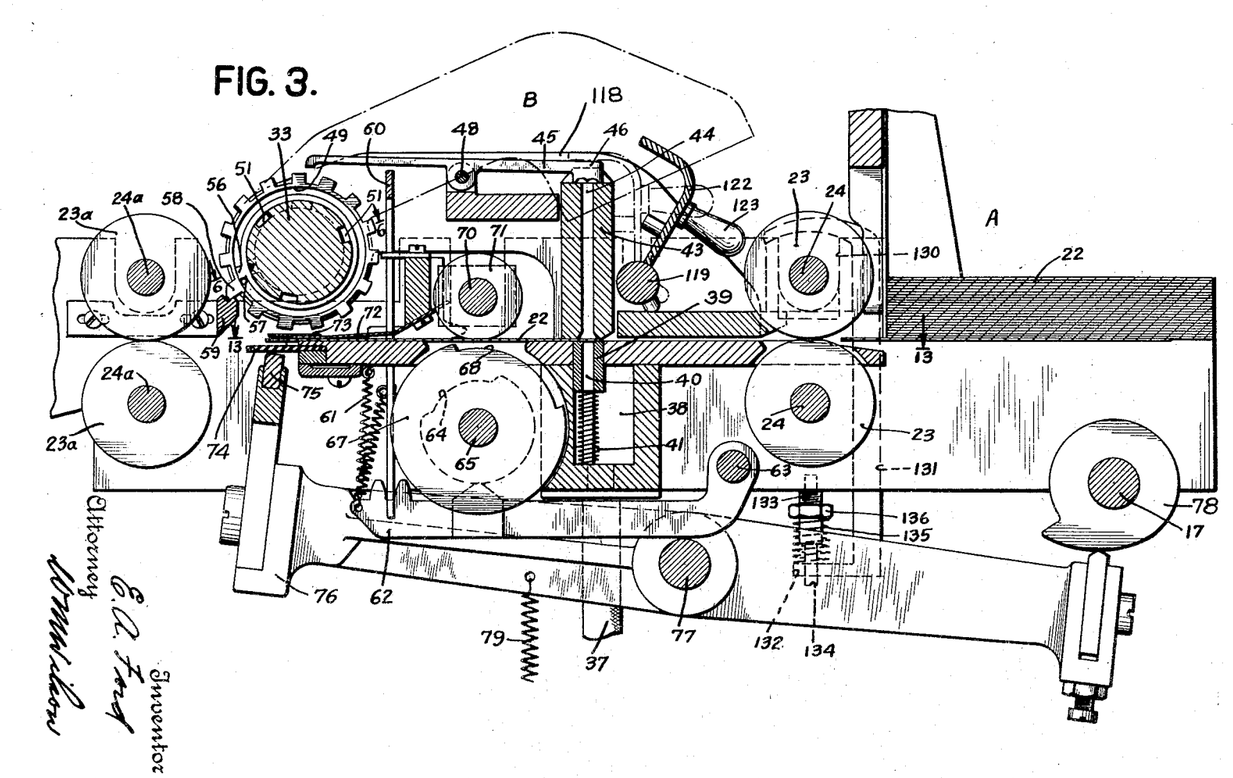
Fig. 3 is an enlarged view of the card analyzing and printing mechanism.
Figures 11, 12:
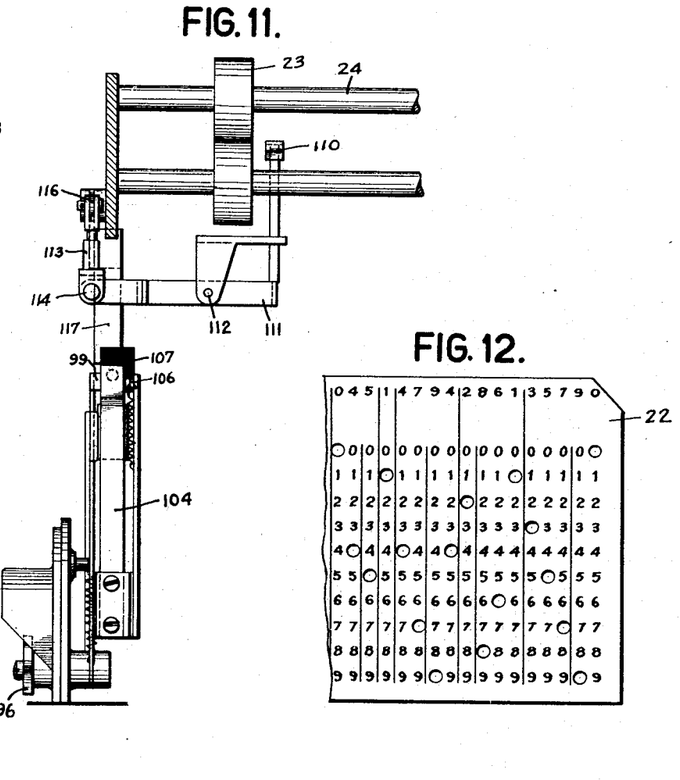
Fig. 11 is a side elevation of parts in Fig. 10.
Fig. 12 is a view of the record card.

The general operation of the machine may be understood from Figs. 1, 2 and 3 in which the usual card magazine is indicated generally at A, the analyzing and printing section at B, and the discharge pocket at C. After perforated cards have been placed in the magazine A and the main line switch S closed, the machine may be put into operation by depressing the start key 96. The cards are then fed singly by suitable picker mechanism to the analyzing and printing section B where the perforations are sensed while the card is in motion. After the card has been analyzed its forward motion is arrested while suitable mechanism effects printing of the characters represented by the index points on the card. This printing is done upon the card itself and is preferably located along its upper edge as indicated in Fig. 12 in which the character represented by the perforation in each column is printed directly over the column. After the printing operation is completed the card is automatically delivered to the discharge magazine C from which it may readily be removed by the operator.

Machine drive

In Fig. 2 a worm shaft 10 having a pulley 11 mounted thereon is adapted to be maintained in constant rotation by a motor 12 (Fig. 1) with which it has connection through a belt 13 and a pulley 14 mounted on the motor shaft. At one end of shaft 10 is a worm 15 meshing with a worm gear 16 secured to a shaft 17. Also secured on the shaft 17 is a cam 18 which cooperates with a plate 19 pressed in one direction by springs 20 against the cam 18. Plate 19 is pivotally mounted at its lower end and at its upper end has connection with a card picker 21 mounted for reciprocation in the frame of the machine.

The operation of the parts is such that for each revolution of shaft 17 picker 21 is adapted to advance a card 22 from beneath the stack in magazine A to a pair of constantly running rollers 23 which are carried by shafts 24 journalled in the frame of the machine. The shafts 24 carry at their ends worm gears 25 meshing with a threaded portion 26 of the shaft 10. The rollers 23 advance the card to the analyzing mechanism where it is sensed and printed upon and subsequently advanced to a pair of constantly running rollers 23a mounted upon shafts 24a having gears 25a meshing with a threaded portion 26a of shaft 10 in a familiar manner. From the rollers 23a the card is passed to the discharge pocket C.

Upon the shaft 17 is mounted a box cam 28 with which a cam roller 29 cooperates to actuate a link 30 which has connection to a sector 31. The sector 31 meshes with a gear 32 secured to print shaft 33 to cause oscillation thereof.

Card analyzing mechanism

Figure 14:
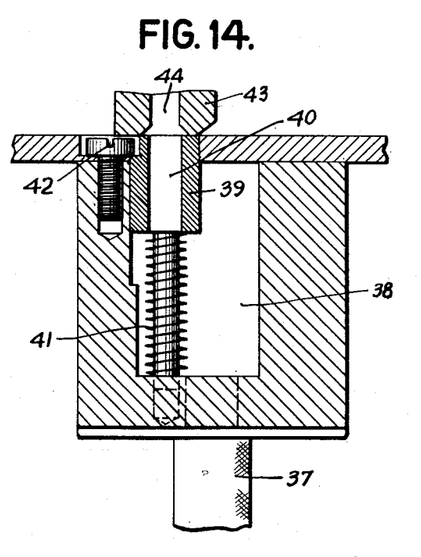
Fig. 14 is a sectional detail on line 14—14 of Fig. 13 of the analyzing mechanism.

In Fig. 1 the motor 12 has driving connection at one end to an air pump 34 of the rotary type which is connected by a hose 35 to a reservoir 36. The opposite side of reservoir 36 has a double hose connection 37 to a pressure chamber 38. The cooperation of pump 34, reservoir 36 and pressure chamber 38 is adapted to maintain a constant air pressure in the chamber (see also Figs. 3 and 14). Mounted in chamber 38 and forming an outlet therefrom is a bar 39 having a series of openings 40 spaced thereon which lie in the path of the perforated columns of the card as the card is fed through the machine. This bar is pressed upwardly by springs 41 located at either end. Adjustable screws 42 are provided to limit the upward movement of the bar 39. Disposed above the bar 39 is a second bar 43 having a series of openings therein corresponding in number and position to the openings 40 and being in alinement therewith.

As the card 22 passes through the machine a perforation therein, coming into alinement with openings 40 and 44, will permit the passage of air from chamber 38 through opening 44 to act upon a printing wheel positioning lever 45. The bar 39 being spring pressed upward bears tightly against the underside of the card 22 and forms a tight seal to prevent passage of air until a perforation occurs or until the card has fully passed the opening 40.

Figure 15:
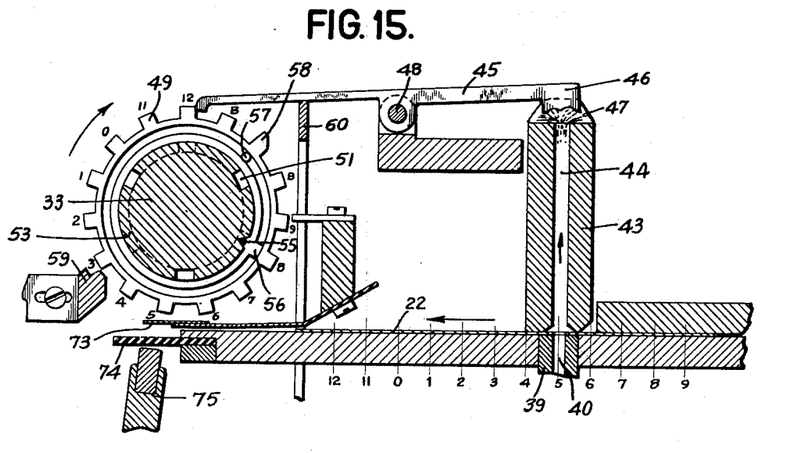
Fig. 15 is an enlarged detail of analyzing and printing mechanism with the parts in moved position.

The lever 45 as seen in Fig. 15, has its end 46 which is in cooperation with the opening 44 guided between extensions 47 to prevent the escape of air in a transverse direction. The end 46 is given a configuration as shown to follow the theoretical path of air flow as it proceeds upwardly in opening 44 to strike the lower part of end 46 where its pressure is sufficient to tilt the lever 45 about its pivot 48. The construction of the end 46 is such as to overcome the tendency of the impinging air to form a pocket of reduced pressure to interfere with the upward movement of end 46.

Printing type wheels

Figure 6:
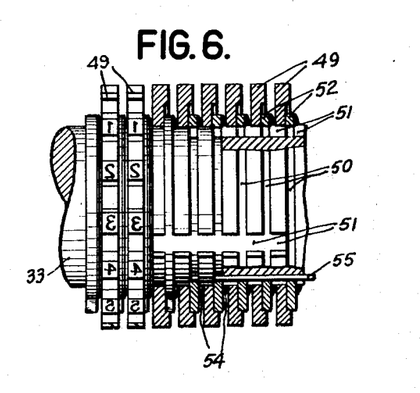
Fig. 6 is a section on line 6—6 of Fig. 3 showing the manner of construction of the printing wheels.

The printing type wheels 49 are mounted upon the shaft 33 and individually connected thereto by frictional means now to be described. In Figs. 6 and 15 the shaft 33 is shown as having a series of circumferential grooves 50 and several longitudinal slots 51 intersecting the grooves 50 and of the same depth. A type wheel 49 is slid upon the shaft 33 and a lock washer 52 having inwardly extending projections 53 which cooperate with the slots 51 of the shaft is also slid upon the shaft against the type wheel 49. The lock washer 52 is moved longitudinally upon the shaft 33 until it is in position upon its corresponding groove 50 wherein it may now be turned so that its projections move out of alinement with the grooves 51 as in Fig. 15. This, as is now quite obvious, forms a series of channels whose sides are the washers 52 and in each of which are disposed a type wheel 49 and a friction spring 54.

When all the washers 52 have been moved to the locking position of Fig. 15, a rod 55 is inserted parallel to the axis of shaft 33 to key the washers to the shaft in their moved position so that now as the shaft 33 turns in either direction positively moving therewith the washers 52, the frictional engagement with the spring 54 will cause the corresponding type wheel to follow. The normal or restored position of the type assembly is as in Fig. 3, wherein an outwardly extending projection 56 of the washer 52 cooperates with a pin 57 secured to the type wheel to hold the type wheel in a counterclockwise position. An elongated tooth 58 coacts with a common stop bar 59 to limit the counterclockwise movement of the type wheel.

The operation of the parts and the timing is such that as the card 22 is advanced to successively register its index point positions with the openings 40 and 44, the type wheels are rocked in a clockwise direction to successively bring the type elements thereon into register with the left end of the lever 45. Lever 45 is so balanced upon the rod 48 that when a perforation in a card permits the air to flow upwardly against the end 46, the opposite end of the lever will move downwardly into the path of the wheel 49 interrupting its clockwise movement to position the type element corresponding to the perforated index position of the card on the printing line. In Fig. 15 the relative positions of the parts are shown when a perforation registers with the air passageway to interrupt the type wheel with the corresponding printing element in position for printing.

The card continues to advance until its trailing edge is in position over opening 40 as in Fig. 3. In this position the forward movement of the card is momentarily interrupted while printing takes place upon the leading margin of the card from such wheels as have been positioned. The trailing margin of the card being still in cooperation with the openings 40 and 44 when such printing takes place is subjected to the upward pressure of the air in chamber 38 which thus serves to firmly hold the card in printing position.

After printing has been effected the card is advanced to the pocket C and the shaft 33 is rocked through the gearing described in a counterclockwise direction frictionally moving the type wheels until the tooth 58 cooperates with the stop 59. A restoring bail 60 may be provided to positively rock the levers 45 to their normal position. The bail 60 is U-shaped, having its two depending sides spring connected to arms 62 pivoted at 63 and cooperating with cams 64 which are mounted upon a continually running shaft 65 which has driving connection to shaft 10 through threaded portion 66 thereon. Shaft 65 also carries a roller 67 having a cutaway portion 68 which cooperates with the card to permit the aforementioned interruption when the cards advance. The forward end of the shaft 65 has gear connection 69 with a shaft 70 upon which is mounted a roller 71 which when it cooperates with the high portion of roller 67 is adapted to advance the card through the analyzing mechanism.

Figure 13:
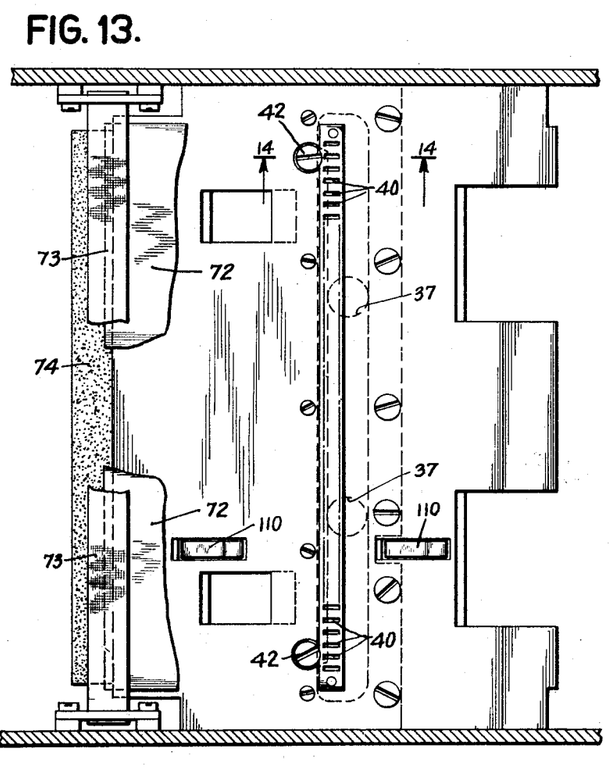
Fig. 13 is a view taken on the line 13—13 of Fig. 2.

The leading edge of the card as it approaches the printing position is guided by a flexible plate 72 beneath ink ribbon 73 (see Figs. 3 and 13). The platen 74 is in the form of a wide web of flexible material and is adapted to be moved into cooperation with the card, ink ribbon and type element to effect printing by a hammer 75. The hammer 75 is secured to one end of the lever 76 pivoted at 77 and adapted to be moved upwardly into printing position by a cam 78 mounted on shaft 17. A spring 79 is provided to keep the cam and lever in cooperation.

*Ink ribbon mechanism*

Figure 4:
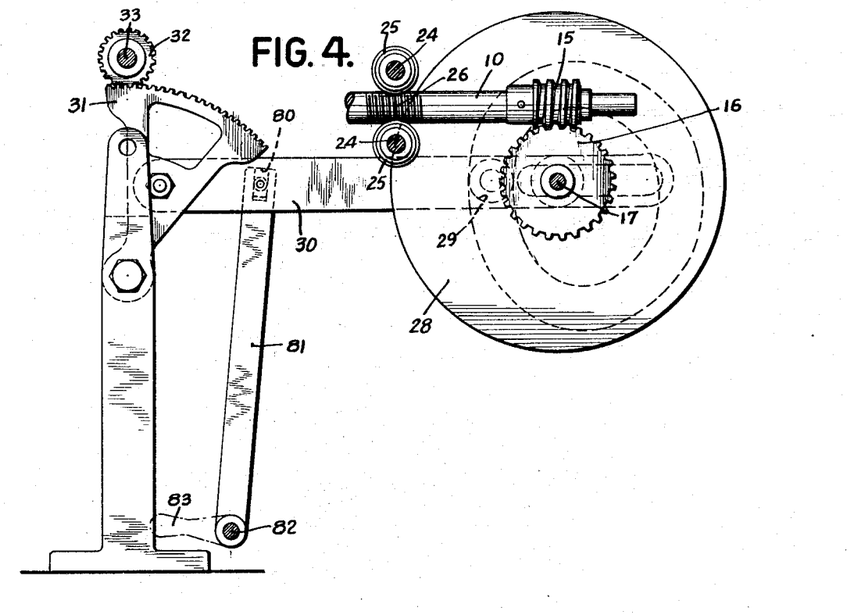
Fig. 4 is a section on line 4—4 of Fig. 2 showing the manner of driving the printing wheels.

Means are provided for preventing the sagging of the ink ribbon by imposing a constant tension thereon. The ink ribbon mechanism itself forms no part of this invention and will be described but briefly. In Fig. 4 a block 80 is pivotally mounted upon the link 30 and has yoke connection to an arm 81 fixed upon a rod 82. Also secured to rod 82 is a finger 83 adapted to be rocked down and up again for each revolution of shaft 17.

Figure 7:
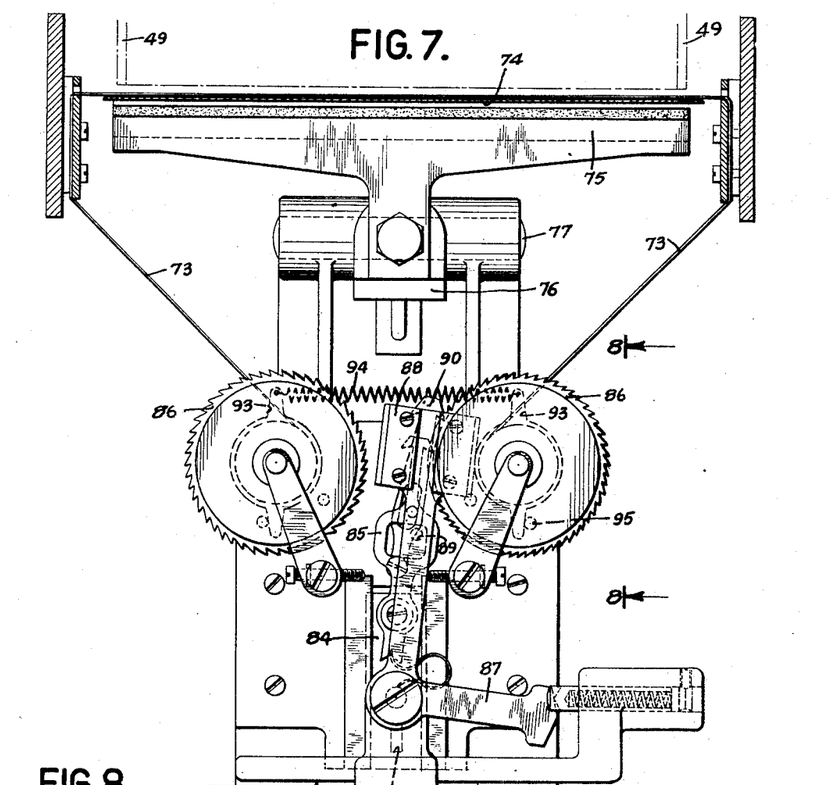
Fig. 7 is a view taken on the line 7—7 of Fig. 1 illustrating the printing ribbon mechanism.

The free end of the arm 83 is disposed in a suitable opening in a slide 84 and is adapted to move the slide up and down in suitable guides. Pivotally mounted upon the slide is an actuating pawl 85 which cooperates with the teeth of ratchets 86. A pivoted member 87 is provided with a head 88 which cooperates with the ink ribbon and is adapted as in Fig. 7, as the ribbon is wound upon the right hand spool, to gradually rock the lever 87 in counterclockwise direction until sufficient ribbon has been accumulated upon that spool to cause the head 88 to fall over against the left hand spool carrying with it a pin 89, the actuating pawl 85 and also the usual holding pawl 90.

Figure 8:
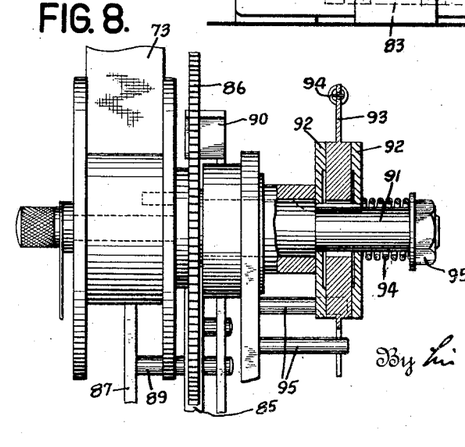
Fig. 8 is a view taken on line 8—8 of Fig. 7.

In Fig. 8 the shafts 91 which are relatively fixed with respect to the ribbon spools have keyed thereon disks 92 frictionally engaging between them members 93. Springs 94 and adjusting nuts 95 are provided to regulate the amount of frictional contact between the plates 92 and the member 93. The members 93 are connected at their upper ends by a stout spring 94 whose tendency it is, as may be seen by an inspection of Fig. 7, to resist unwinding of the ribbon 73 from either spool. Pins 95 are provided to limit movement of the member 93. Thus in Fig. 7 the right hand spool is turned in a counterclockwise direction to feed the ribbon which action draws upon the ribbon and tends to turn the left hand spool in a counterclockwise direction. This turning is resisted by the spring 94 through the frictional devices described.

Operating key mechanism

Figure 10:
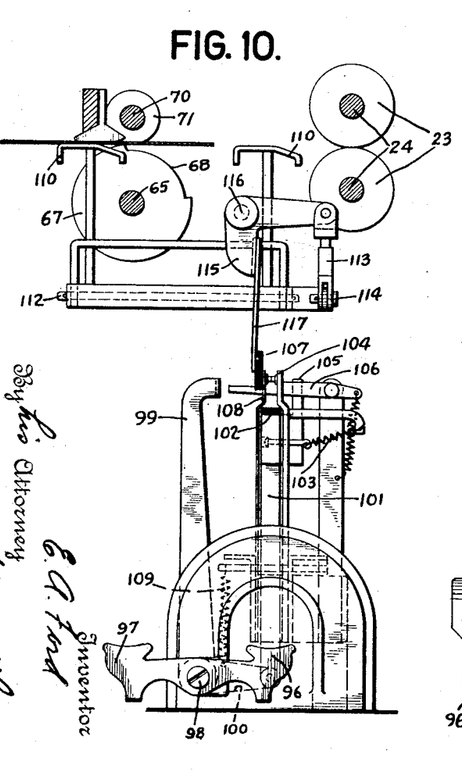
Fig. 10 is a detail of start and stop key mechanism.
Figure 16:
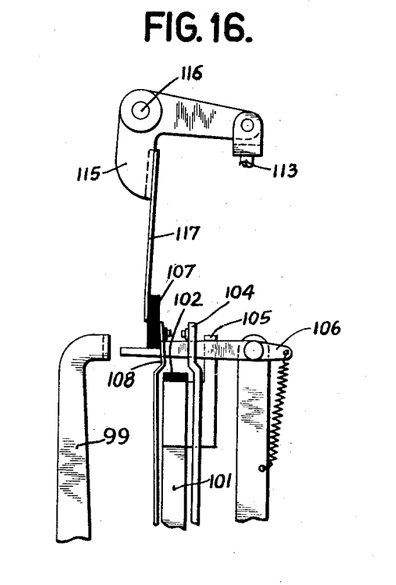
Fig. 16 is an enlarged detail of parts shown in Fig. 10 in another position.

The start and stop key device has mechanism adapting it to be operated to stop the machine when the supply of cards is exhausted. In Figs. 10 and 16 the start key 96 is integral with the stop key 97 pivoted upon a common stud 98 to which is also secured an upwardly extending finger 99 and an arm 100 having connection at its free end to an upwardly extending member 101. Member 101 carries a block of insulating material 102 at its upper end and is biased by a spring 103 in a clockwise direction against contact blade 104. Member 101 also carries a hook 105 cooperating with a latch 106.

Depression of the start key 96 causes downward movement of the member 101 which first through its hook 105 rocks the pawl 106 against its spring to remove said pawl from cooperation with a block 107. Continued movement of the key 96 will then rock the finger 99 against the block 107 to move the spring blade contact 108 which abuts the opposite side of the block against contact 104 thus closing the circuit through the motor 12 to commence the operation of the machine.

If no cards are in the machine, release of the key 96 will permit spring 109 to restore the finger 99 to normal position and the tension of spring blade 108 will open the contacts to stop the machine. A pair of card levers 110 are disposed in the path of travel of the card and spaced in such manner that continued feeding of cards will keep one or the other of the card levers in depressed position. Either of these card levers when depressed will rock a lever 111 pivoted at 112 to move upwardly a connecting link 113 pivoted at 114 to the lever 112. The upper end of link 113 has connection to one arm of a bell crank 115 pivoted at 116 to the frame of the machine. To the other arm of bell crank 115 is secured a spring blade 117 the lower end of which carries the already mentioned block 107 so that through this mechanism the continued depression of the card levers causes the clockwise rotation of bell crank 115 and a continued tendency to move block 107 to the right as viewed in Figs. 10 and 16. Thus with the cards in the supply hopper key 96 is depressed to close the contacts 108, 104 to start the machine, cards advancing through while such key is still depressed and through the control just pointed out move the block 107 against the blade 108 holding the same in closed position after key 96 has been released. The contacts will maintain this closed position until failure of cards to feed at which time block 107 will move to the left and contact blade 108 will follow due to its own tension.

The depression of stop key 96 while cards are feeding through the machine will by turning stud 98 in a counterclockwise direction move member 101 upwardly forcing the insulated member 102 between the blades 108, 104 to positively move the blade 108 away from the blade 104 permitted to do so by the flexible nature of the spring connection between block 107 and bell crank 115. Upon such opening of the contacts the latch 106 will snap under block 107 to hold the contacts open until the start key has again been depressed. The normal position of the parts is shown as in Fig. 16 with the block 107 latched against operation so that in the event that the operator for some reason or other should turn the machine over by hand to feed a card into the machine the latch 106 would prevent the automatic closing of the circuit due to the co-operation between the card and the card levers 110.

Removing the card from the machine

Figure 9:
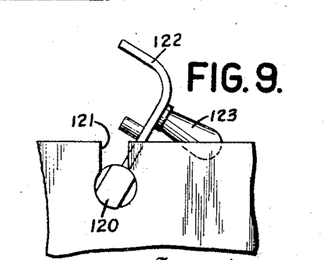
Fig. 9 is a detail of a locking device.

In Fig. 3 the bar 43 and the levers 45 together with their pivot rod 48 are contained between the side arms 118 which are loosely pivoted upon the shaft 33. A rod 119 extends between the side arms 118 and has its ends flattened as at 120 in Fig. 9 and extending into the slots 121 in the fixed frame of the machine. With the parts as shown in Figs. 3 and 9 the ends 120 are in such cooperation with the slots 121 as to prevent any counterclockwise rocking of the side arms 118. Should it be desired for any purpose to gain access to the card 22 in the printing position an L-shaped plate 122 having a handle 123 may be rocked in a counterclockwise direction with its supporting rod 119 to the dotted line position indicated in Fig. 3 wherein the levers 45 are locked with respect to the bar 43. This rocking of the rod 119 also turns its ends 120 into alinement with the slot 121 permitting rocking of the side plates 118 to lift the parts connected thereto. Any suitable latching means (not shown) may be provided to hold the side arms in elevated position.

Pressure rollers

Figure 5:
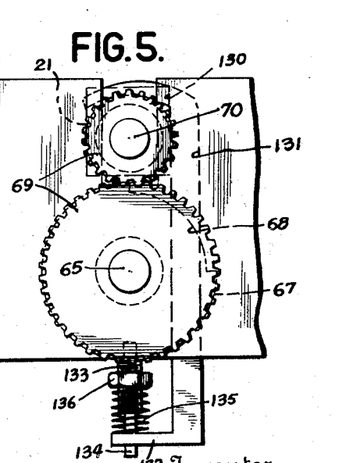
Fig. 5 is a detail view of card roller driving gears taken on line 5—5 of Fig. 2.

The various pairs of feed rollers are urged into close engagement with each other by the following means. The lower roller shafts 24, 24a and 65 are journalled in bearings which are fixedly secured in the side frames of the machine. The upper rollers 23, 23a and 71, however, have their respective shafts 24, 24a and 70 journalled in bearings 130 which are slidable in suitable slots as shown in Figs. 5 and 3. The upper side of bearing 130 is arcuate to cooperate with a hook 131 which has an extension 132 at its lower extremity. A threaded rod 133 is secured in the frame of the machine and has a stem 134 of reduced diameter fitted in a suitable opening in extension 132. A spring 135 is adjustably compressed by nut 136 to bear down on hook 130 to obtain proper frictional contact between the feed rollers.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

1. In a machine of the class described, record feeding means, a pneumatic device for analyzing records provided with index points while the records are in motion and printing means controlled by said device for effecting printing on the records.

2. In a record controlled machine, an analyzing device, means for feeding the record to said device and pneumatic means to arrest the movement of said record through said device.

3. In a record controlled machine, a pneumatic analyzing device, means for feeding the record to said device and pneumatic means to arrest the movement of said record through said device.

4. In a record controlled machine, a pneumatic analyzing device, means for feeding the record to said device, said analyzing device being adapted to arrest forward movement of said record through said device.

5. In a machine of the class described, differentially movable type carriers, record feeding means, and means to analyze records bearing index points while the records are in motion including means for controlling the passage of air through the records and members adapted to be actuated by the passage of air, said members serving as stops to engage and arrest the type carriers in printing position corresponding to the analyzed data.

6. In a machine of the class described, record analyzing means, a printing device having a plurality of type wheels, a common driving element and means controlled by said analyzing means for individually connecting said type wheels to said driving element to move the same to unrelated registering position.

7. The combination in a printing device of a common driving element, a plurality of type wheels individually connected thereto by frictional means, record analyzing means, means to cause relative movement between said driving element and said type wheels and means controlled by said analyzing means for individually releasing the wheels to the driving action of the elements for selectable positioning of the same in different registering positions.

8. In a printing device having a driving element, type wheels frictionally mounted thereon, means to operate said driving element and pneumatic means to cause relative movement between said element and said type wheels.

9. In a record controlled machine, record analyzing means, a plurality of type wheels and a common driving element therefor, frictional means connecting said type wheels and said driving element, means controlled by said analyzing means for causing relative movement between said type wheels and said driving element to position said type wheel and a common hammer to effect printing.

10. In a machine of the class described, a pneumatic card analyzing device, a printing mechanism adapted to be controlled thereby, and means to position the card in printing position by engagement with the trailing edge thereof.

11. In combination, differentially movable type carriers, means for positioning said carriers in printing position, said means comprising pivoted stops, pneumatic means to move said stops into cooperation with said carriers, and means for moving said stops out of cooperation with said carriers.

12. In a printing device, record analyzing means, a common driving element, a plurality of type carriers actuated thereby, means for moving said element and carriers in one direction, means controlled by said analyzing means for causing relative displacement between said carriers and element, and frictional means for moving said carriers in the reverse direction an amount equal to the said displacement.

13. In a machine of the class described, a pneumatic analyzing mechanism having a pressure chamber, a plurality of ducts leading therefrom and a plurality of stops positioned by the passage of air through said ducts, and differentially movable type carriers adapted to be positioned by said stops.

14. In a record controlled machine, pneumatic analyzing mechanism adapted to read cards in motion, means for feeding cards past said analyzing mechanism and printing means controlled by said analyzing mechanism.

15. In a record controlled machine, pneumatic analyzing mechanism, adapted to read cards in motion, means for feeding cards past said analyzing mechanism and means controlled by said analyzing mechanism for printing on the card characters representative of the data analyzed by the analyzing mechanism.

16. In combination, record analyzing means, a printing device having an oscillatory driving element, type wheels associated therewith and means controlled by said analyzing means for frictionally coupling said wheels to said element for oscillation therewith.

17. In a machine of the class described having record analyzing means, means for advancing records into cooperation therewith, an electric circuit for controlling the operation of said advancing means, a contact for initiating the operation of said circuit, a hand operated element for controlling said contact shiftable into different positions to positively open said contact in one position and to positively close said contact in another position and means controlled by the cooperation of a record with said analyzing means for maintaining said contact in operative position.

18. In a machine of the class described having record analyzing means, means for advancing records into cooperation therewith, an electric circuit for controlling the operation of said advancing means, a contact in said circuit, a key for closing and opening said contact in succession upon successive operations of said key, and means controlled by the cooperation of a record with said analyzing means for causing closure of said contacts independently of said key.

19. In a machine of the class described having record analyzing means, means for advancing records into cooperation therewith, an electric circuit for controlling the operation of said advancing means, a contact in said circuit, a key for closing and opening said contact in succession upon successive operations of said key, and means controlled by the cooperation of a record with said analyzing means for causing closure of said contacts independently of said key, and means controlled by the position of said key for preventing the closure of said contacts by said last named means.

20. In a machine of the class described having record analyzing means, means for advancing records into cooperation therewith, an electric circuit for controlling the operation of said advancing means, a contact included in said circuit, a key for closing said contact, a card lever adapted to cooperate with said analyzing means to close said contact independently of said key, said key being adapted to open said contact independently of said card lever.

In testimony whereof I hereto affix my signature.

EUGENE A. FORD.